July 16, 1968  P. A. WHISLER  3,392,770

FORAGE HARVESTER

Filed April 19, 1966

Inventor:
Paul A. Whisler

United States Patent Office 3,392,770
Patented July 16, 1968

3,392,770
FORAGE HARVESTER
Paul A. Whisler, Milwaukee, Wis., assignor to Allis-Chalmers Manufacturing Company, Milwaukee, Wis.
Filed Apr. 19, 1966, Ser. No. 543,645
8 Claims. (Cl. 146—120)

ABSTRACT OF THE DISCLOSURE

This disclosure relates to a forage harvester provided with a spraying device for applying a fluid both to the chopping knife and to the material being chopped.

The present invention relates to ensilage apparatus, and a general object of the invention is to improve the construction and operation of devices of this class.

Devices for reducing crop material such as corn to very short lengths for storage in silos have been in use for a long time, both at the silo and in the field, and the practice of treating grass or hay in this manner has become common.

Such mechanism for so reducing or cutting crop material has taken various forms, but typically the crop material is impelled in the form of a bat or mat on an endless conveyer, a series of rollers or the like, through a chute and over a shear bar with which cooperates a rotor of some sort carrying one or more knives, which cut the crop into suitable lengths for the purpose of storage. While these devices have been generally satisfactory, there has been some difficulty, and one of the difficulties particularly when grass or hay is treated, is the accumulation of wax, gum or the like on the surfaces of the chute, the conveyer, the shear bar and the knife, and which impairs the efficiency of the feeding and cutting, and in aggravated cases sometimes stops it altogether.

It is the principal object of the invention to provide a device which will eliminate this difficulty.

More particularly, it is an object to provide means for feeding a suitable fluid to the material in a particular manner such that any wax or gum will be softened or dissolved and not allowed to accumulate and interfere with feeding and cutting of the material, and it is a further object to provide a device which will feed fluid in this manner, wherein the amount of fluid may be controlled, so that the material when it reaches the silo will carry a desirable, but not an excessive amount of fluid, and so the fluid supply will last for a reasonable time between fillings.

Figure 1:
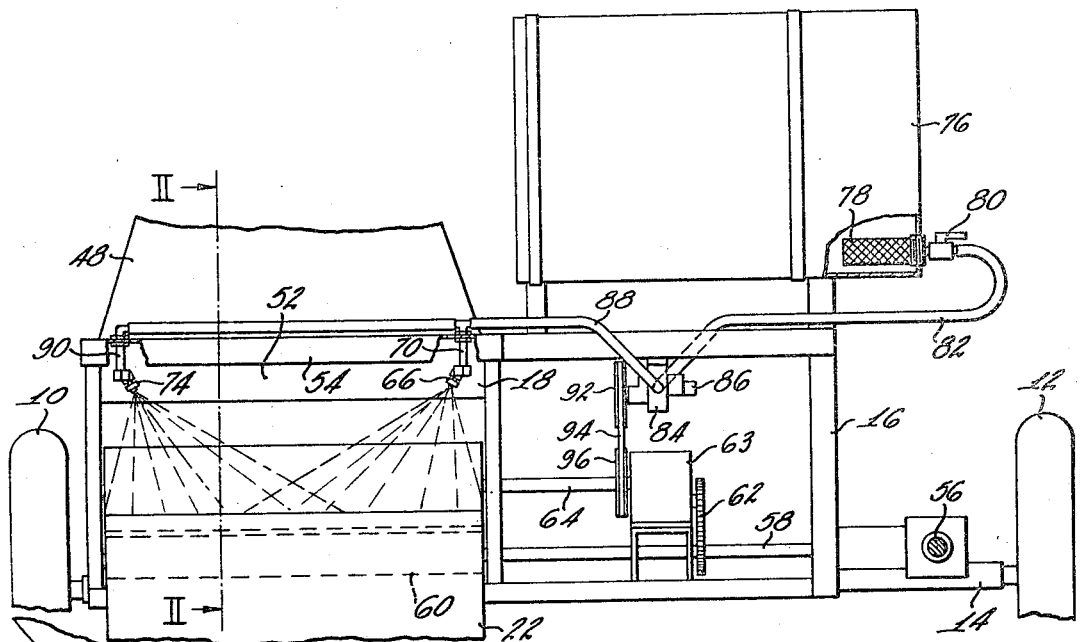
Figure 2:
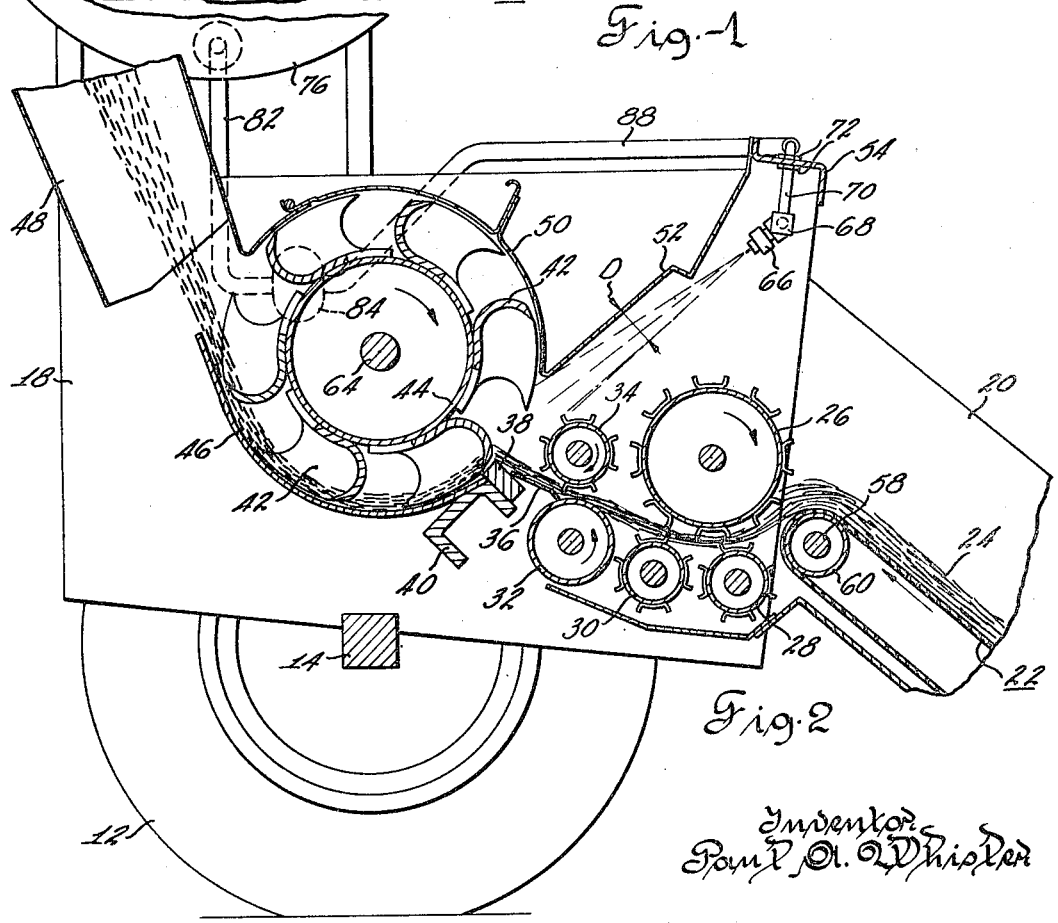

Further objects and advantages will become apparent from the following description and accompanying drawings, in which:

FIG. 1 is a fragmentary front elevation of a mobile silage or forage harvester embodying the invention; and FIG. 2 is an enlarged vertical sectional view of the same taken on the line II—II of FIG. 1.

The drawings illustrate a preferred embodiment of the invention, which is shown in connection with a mobile forage harvester or ensilage cutter, although it is to be understood that the advantages of the invention could be realized in a stationary ensilage cutter or silo filler. The illustrated machine is supported and transported on wheels 10 and 12 journaled on an axle 14 carrying a frame 16 upon which is built or supported a housing or casing 18. The structure is stabilized and propelled along the ground by any suitable or well known means such as a drawbar attached to a tractor. These parts are not shown, as they are conventional and form no part of the present invention. A feeder trough 20 is mounted on, or forms part of casing 18, and has a conveyer means 22 therein which conveys crop material 24 upwardly and backwardly toward and into casing 18 where it is contacted and impelled by a beater feed roll 26 between itself and lower feed rolls 28 and 30 into the bite between a lower smooth feed roll 32 and an upper feed roll 34. The mass of crop material coming up trough 20 is reduced by this means to a relatively thin bat or mat which is projected over a feed plate 36 having one edge contiguous to the surface of smooth feed roll 32, and resting on a shear bar 38 of a length substantially equivalent to that of roll 34, fixed on a rugged frame member 40 forming part of frame 16. A series of knives 42 carried by a rotor 44 revolve in a path determined by rotor 44 such that their sharp edges travel close to or in shearing relation along the length of shear bar 38 so that the mat projected over feed plate 36 will be cut into short lengths by the knives while supported on the shear bar. The rapid rotation of the knives carries the cut material around rotor 44 on a curved housing or wrapper sheet 46 conforming substantially to the path of the knives, and throws it up a chute 48 to a point of disposition as for example a trailing wagon.

It will be noted that upper feed roll 34 is spaced an appreciable distance D in advance, or up-stream from the path of knives 42, for a purpose to appear.

The upper "side" of rotor 44 and its knives 42 is enclosed by a curved plate structure 50 which joins with an upwardly and forwardly directed throat plate 52 supported in part on a frame member 54 forming part of frame 16.

The various parts of the machine are driven in well known manner from a power take off shaft 56 which actuates a shaft 58 connected in the present instance with a conveyer roll 60 forming part of conveyer 22, and it drives, through a chain or the like 62 and a gearset 63, a shaft 64 which in the present instance drives rotor 44. Drives to the feed rolls and beater roll are provided, which are conventional, and not further described, since they form no part of the invention.

The machine so far described is typical of those that have trouble with gumming of the knives, shear bar, feed plate, chute, etc.

The wax or gum is soluble to a certain extent in water, and the difficulty can be corrected by the application of water or other liquid in a controlled manner to the crop and parts affected. For this purpose a spray nozzle 66 is supported on a universally adjustable coupling 68 carried by a short length of pipe 70. Pipe 70 extends through a suitable opening in frame member 54 and is clamped therein by lock nuts 72 on the pipe and engaged with opposite surfaces of frame member 54. Thus the axial position of pipe 70, and therefore the elevation of nozzle 66 can be adjusted by suitable manipulation of the lock nuts, while the direction in which the spray is projected can be adjusted by manipulation of the universal coupling 68. Nozzle 66 is preferably located generally spaced substantially above one end of beater roll 26, and a similar or identical nozzle 74 is located above the other end of roll 26 and similarly spaced therefrom. The nozzles are positioned in front of the throat plate 52, and where they are entirely out of the path of the crop material, so as not to be contacted and fouled by it. They are therefore readily accessible for adjustment from either side of feed trough 20, and it is not necessary to go deeply inside the machine, or to even reach extensively over any part of it in order to perform the adjustment.

Nozzles 66 and 74 are aimed so that their spray is projected in a downward and backward direction through the above mentioned space D between knives 42 and upper feed roll 34, and the nozzles are of the type which will produce a column of fine spray or mist which forms a pattern of a shape substantially like that of said space, or somewhat larger so as to spray the mat of material passing over feed plate 36 and shear bar 38, and also preferably to spray knives 42 and feed roll 34 to a desired extent. In view of the controlled pattern or contour of the spray, even coverage of the material is possible without the use of more than the two nozzles disclosed, and by adjusting the nozzles so that the two columns of spray overlap, an extra portion of liquid can be applied to the middle of the mat where it is inclined to be thicker than at the edges, if conditions make this desirable.

It has been found that a certain amount of moisture between the parts in contact with the crop material and the material itself is effective in preventing the buildup of gum and wax, and for this reason the spray pattern is shaped so that a limited proportion of the liquid is sprayed on roll 34. Owing to the clockwise direction of rotation as seen in FIG. 2, much of this liquid is thrown back onto beater roll 26, and transmitted thereby to the crop material passing over rolls 28 and 30. The liquid therefore finds its way to the surfaces that tend to accumulate gum, and prevents the buildup thereof.

The liquid may be of a nutrient, preservative, or other character, within the contemplation of the invention.

Liquid for nozzles 66 and 74 is stored in a tank 76 carried on frame 16, and is drawn out through a filter 78, a stop-cock 80 and a hose or pipe 82 to a pump 84 wherein it is raised to the appreciable pressure necessary for operation of nozzles 66 and 74. A bypass 86 of well known type is adjustable to determine and maintain the pressure to which the liquid will be raised. Variations in this pressure will cause corresponding variations in the rate of delivery of fluid from the nozzles, and therefore the amount of fluid applied to the crop material and machine parts can be readily controlled by adjusting bypass 86. The fluid under pressure is transmitted to nozzles 66 and 74 by a hose or pipe 88 connecting with pipe 70 and with a pipe 90 carrying nozzle 74.

Since the nozzles require a relatively small amount of fluid to produce the desired fine spray or mist, the supply in tank 76 will last for a reasonable time and the nuisance of constantly filling the tank is avoided, although adjustment of bypass 86 will cause the nozzles to supply enough to moisten the crop material if this is necessary.

Pump 84 may be driven in any convenient manner, in the present instance having a pulley 92 driven by a belt 94 from a pulley 96 fixed on shaft 64.

The operation of the invention is thought to be clear from the above, it being noted that liquid is pumped from tank 76 and delivered to nozzles 66 and 74 under controlled pressure when the machine is running. Nozzles 66 and 74 spray the liquid in a predetermined pattern onto the crop material from a point substantially removed from the material where they will not be contacted by it. They can be aimed with accuracy so as to cover the area of material exposed on its way from feed roll 34 to cutter knives 42, and to also treat roll 34 as much as desired along with adjacent rolls and other parts to which the liquid may find its way. The distribution of the spray may be controlled by aiming the nozzles as desired, as permitted by their universal couplings, and by moving them nearer to or farther away from the bat by adjustment of the lock nuts on frame member 54. In this way a relatively precise control is afforded of the exact area covered by the spray, while the rate of application is easily controlled by adjustment of the fluid pressure at bypass 86.

It will be apparent that the adjustment can be made with a maximum of facility and convenience since the nozzles are out in front away from proximity to the feeding mechanism, and the results of the adjustments can be immediately observed and further adjustments made if necessary. The action of the pump in providing substantial pressure makes possible the use of nozzles which produce a fine mist, if desired, so that thorough distribution of the liquid is effected without the application of an excessive amount thereof.

Although a specific embodiment of the invention has been shown and described, it is to be understood that variations in the invention may occur to others skilled in this art, and that the invention is not to be taken as limited in any manner except by the claims.

The embodiments of the invention in which an exclusive property or privilege is claimed are defined as follows:

1. A material reducer including a casing, a rotor supported in the casing and carrying a knife, a shear bar supported in shearing relation to the knife and extending along the length thereof, crop feeding means spaced from said shear bar, having a portion of an effective width substantially equivalent to the length of said knife and shear bar and moving in a direction toward said knife, nozzle means spaced from said crop feeding means and constituted to project a spray of fluid on said knife and across the space between said knife and said crop feeding means and onto crop material being impelled by said crop feeding means across the space between said feeding means and said knife and over said shear bar into position to be acted upon by said knife, and means for supplying fluid under pressure to said nozzle means.

2. A material reducer including all of the characteristics of claim 1, in which said nozzle means comprises a pair of nozzles spaced from each other in a direction along the length of said shear bar a distance substantially equivalent to such length and spaced from said feeding means a distance sufficient to substantially avoid contact with crop material being impelled by said feeding means.

3. A material reducer including all of the characteristics of claim 1, in which said nozzle means is positioned to project a spray of fluid onto crop material immediately before contact thereof with said knife.

4. A material reducer including all of the characteristics of claim 1, in which the nozzle means is adapted to be aimed in such a way as to direct its spray to substantially the exact area desired on said crop material being impelled by said feeding means.

5. A material reducer including all of the characteristics of claim 1, in which the nozzle means is constituted to produce a spray pattern of a shape calculated to contact the crop material moving in response to said crop feeding means, in a substantially even manner.

6. A material reducer including all of the characteristics of claim 1, in which said means for supplying fluid under pressure is constituted to be adjusted to supply fluid at selectively different pressures to vary the amount of fluid discharged by said nozzle means onto said crop material.

7. A material reducer including all of the characteristics of claim 1, in which the nozzle means is constituted to deliver the spray of liquid in the form of a mist.

8. A material reducer including all of the characteristics of claim 1, in which said casing includes a forwardly and upwardly directed throat plate extending transversely of the direction of movement of the crop material from a region above said shear bar and feeding means, and of a width substantially equivalent to the length of said shear bar, and in which said nozzle means comprises a pair of nozzles spaced from each other a distance substantially equivalent to the width of said throat plate, adjacent the side edges thereof, spaced in front of said throat plate and spaced upwardly from said feeding means a distance sufficient to be entirely clear of said feeding means and clear of crop material being impelled thereby, to be freely accessible from outside of said casing, and so aimed as to project said spray of fluid downwardly and rearwardly along said throat plate onto crop material being impelled by said feeding means across the space between said feeding means and said knife.

References Cited

UNITED STATES PATENTS

| | | | |
|---|---|---|---|
| 42,484 | 4/1864 | Holbrook | 146—230 X |
| 1,944,577 | 1/1934 | Rose | 146—95 X |
| 2,450,277 | 9/1948 | Frudden | 146—120 |

W. GRAYDON ABERCROMBIE, *Primary Examiner.*